US011822316B2

(12) United States Patent
Song et al.

(10) Patent No.: US 11,822,316 B2
(45) Date of Patent: Nov. 21, 2023

(54) COAL-AIR SYNCHRONOUS DYNAMIC COORDINATED CONTROL METHOD FOR COAL-FIRED UNIT (71) Applicant: SUZHOU TPRI ENER & ENVIRO TECH CO., LTD., Jiangsu (CN)

(72) Inventors: Yubao Song, Jiangsu (CN); Min Zhao, Jiangsu (CN); Jinliang He, Jiangsu (CN); Zhenfeng Mei, Jiangsu (CN); Lipeng Jin, Jiangsu (CN); Wanrong Yang, Jiangsu (CN); Canghai Zhu, Jiangsu (CN)

(73) Assignee: SUZHOU TPRI ENER & ENVIRO TECH CO., LTD., Jiangsu (CN)

( * ) Notice: Subject to any disclaimer, the term of this patent is extended or adjusted under 35 U.S.C. 154(b) by 0 days.

(21) Appl. No.: 18/090,580

(22) Filed: Dec. 29, 2022

(65) Prior Publication Data
US 2023/0185282 A1 Jun. 15, 2023

Related U.S. Application Data (63) Continuation of application No. PCT/CN2021/115072, filed on Aug. 27, 2021.

(30) Foreign Application Priority Data

May 31, 2021 (CN) .......................... 202110598232.1

(51) Int. Cl.
G05B 19/4155 (2006.01)
(52) U.S. Cl.
CPC .................. G05B 19/4155 (2013.01); G05B 2219/50333 (2013.01)
(58) Field of Classification Search
None
See application file for complete search history.

(56) References Cited

U.S. PATENT DOCUMENTS

2007/0113631 A1    5/2007  Deuker

FOREIGN PATENT DOCUMENTS

CN    101498934 A    8/2009
CN    101788155 A    7/2010
(Continued)

OTHER PUBLICATIONS

Written Opinion of the International Searching Authority for PCT/CN2021/115072 dated Jan. 25, 2022.
(Continued)

Primary Examiner — Sean Shechtman
(74) Attorney, Agent, or Firm — Schmeiser, Olsen & Watts, LLP (57) ABSTRACT A coal-air synchronous dynamic coordinated control method for a coal-fired unit is provided, comprising: determining functional relationship between unit loads and designed coal feed rates and functional relationship between unit loads and flue gas operation wet-basis oxygen contents, respectively; obtaining a theoretical wet flue gas volume and a combustion-supporting dry air volume per unit mass of burning coal, and calculating an actual combustion-supporting dry air volume per unit mass of burning coal; calculating an actual low calorific value of feed coal; calculating a combustion-supporting dry air volume and an outlet wet flue gas volume; according to the target value of load instruction at a future time point, calculating a coal feed rate variation and a combustion-supporting dry air volume variation; obtaining an operation wet-basis oxygen content variation; and obtaining target values of the coal feed rate and the operation wet-basis oxygen content to be adjusted.

15 Claims, 2 Drawing Sheets (56) References Cited

FOREIGN PATENT DOCUMENTS

| | | | |
|---|---|---|---|
| CN | 102095774 | A | 6/2011 |
| CN | 102778880 | A | 11/2012 |
| CN | 102799110 | A | 11/2012 |
| CN | 103148473 | A | 6/2013 |
| CN | 103513640 | A | 1/2014 |
| CN | 106225009 | A | 12/2016 |
| CN | 106439770 | A | 2/2017 |
| CN | 107451395 | A | 12/2017 |
| CN | 109519957 | A | 3/2019 |
| CN | 110135065 | A | 8/2019 |
| CN | 110658721 | A | 1/2020 |
| CN | 110991069 | A | 4/2020 |
| CN | 111308886 | A | 6/2020 |

OTHER PUBLICATIONS

International Search Report for PCT/CN2021/115072 dated Jan. 25, 2022.

COAL-AIR SYNCHRONOUS DYNAMIC COORDINATED CONTROL METHOD FOR COAL-FIRED UNIT

CROSS-REFERENCE TO RELATED APPLICATIONS

This application is a continuation application to PCT/CN2021/115072, having a filing date of Aug. 27, 2021, which claims priority to Chinese Application No. 202110598232.1, having a filing date of May 31, 2021, the entire contents both of which are incorporated herein by reference.

FIELD OF TECHNOLOGY

The following belongs to the technical field of coal-fired units, and in particular relates to a coal-air synchronous dynamic coordinated control method for a coal-fired unit.

BACKGROUND

Figure 1:
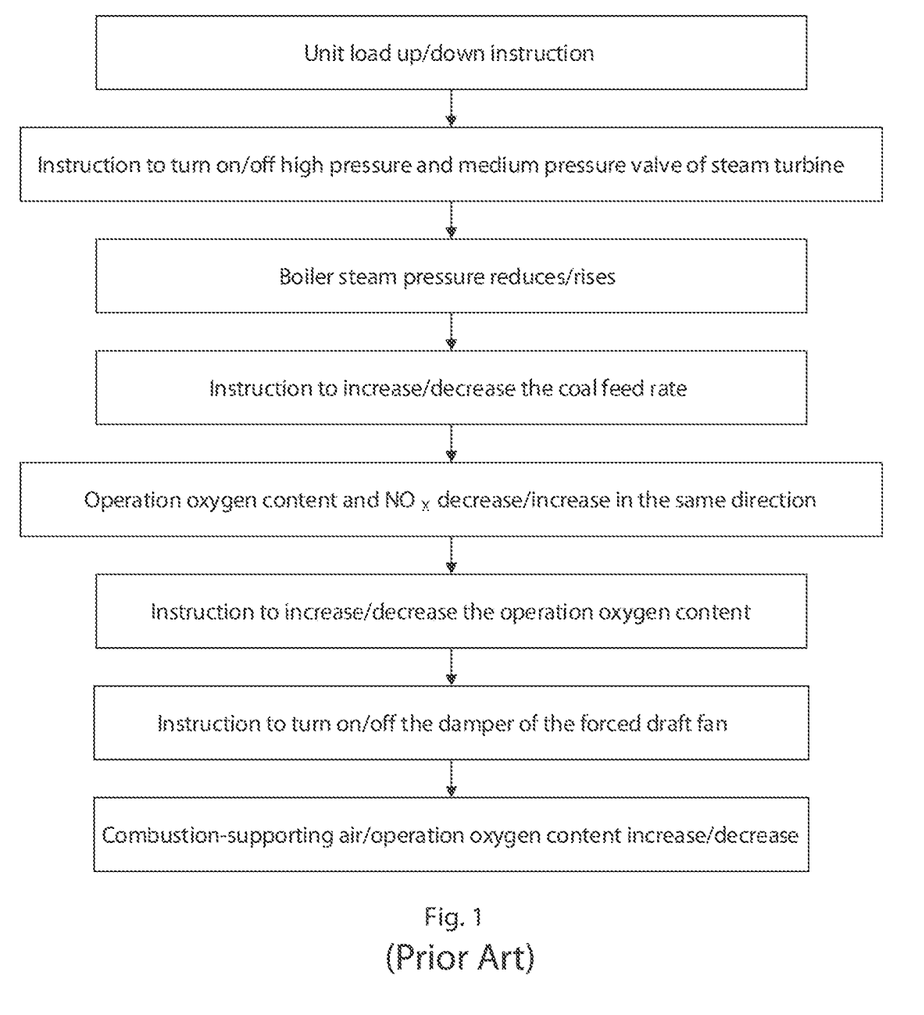
FIG. 1 is a logic block diagram of a traditional series air-coal sequence coordinated control.

AGC (Automatic Generation Control) is an important function in the EMS (Energy Management System) of the unit. The common traditional series coal-air sequence control logic is shown in FIG. 1: after receiving the unit load up or down instruction, turning up/down the high pressure-intermediate pressure governing valve of the steam turbine; after the steam pressure reduces/rises, issuing an instruction to increase/decrease the coal feed, the burning coal enters the furnace for combustion through the coal mill, pulverized coal pipeline and burner; if the oxygen content of the flue gas at the outlet of the economizer decreases/increases, issuing an instruction to turn up/down the damper of the forced draft fan, then the combustion-supporting air enters the furnace for combustion through the coal mill and the air box, to achieve the desired change in the operation wet-basis oxygen content.

In the process of flexible peak load regulation and rapid load up and down of coal-fired units at 2% MCR/min and above, this traditional serial sequence control logic mode is likely to cause the combustion-supporting air volume entering the furnace to lag behind the increase or decrease of coal feed for a long time, breaking the air-coal balanced combustion atmosphere, resulting in violent fluctuations in the concentration of nitrogen oxides in the flue gas at the outlet of the boiler economizer and the operation wet-basis oxygen content. When the load increases, the operation wet-basis oxygen content decreases with the increase of the coal feed, and the concentration of nitrogen oxides decreases greatly; when the load decreases, the operation wet-basis oxygen content increases with the decrease of the coal feed, and the concentration of nitrogen oxides increases greatly.

The concentration of nitrogen oxides in the flue gas at the outlet of a typical boiler economizer varies from 180 to 350 mg/m$^3$ in the load up and down process, while the lag time of online CEMS measurement of nitrogen oxides at the inlet of the downstream SCR flue gas denitration system is about 1 to 3 minutes, which further causes the adjustment of denitration ammonia injection to lag behind the change of unit operating conditions, so it is easy to cause excessive injection of ammonia in a local period of time, the emission concentration of nitrogen oxides is very low, and the escape concentration of ammonia is very high, which aggravates the blockage of ammonium bisulfate in the air preheater, or causes insufficient ammonia injection in a local period of time, and the emission concentration of nitrogen oxides to exceed the standard.

At present, some technologies are trying to solve the control strategy problem of asynchronous coal and air:

Referring to CN110658721A, an adaptive pre-coal feeding method and a system applied to an AGC-R mode of a thermal power unit are disclosed. This method shortens the lag time of increasing and decreasing fuel relative to the load instruction and improves the coordinated load-change ability of the unit. However, this method only enables the unit to predict in advance the increase or decrease of the coal feed during the process of increasing or decreasing the load and cannot solve the advance prediction of the combustion-supporting air volume.

Referring to CN103513640A, an integral optimization method and a system for an automatic power generation control system of a coal-fired unit are disclosed. Although this method improves the coordination of air-coal combustion to a certain extent, it still does not shorten the lag time of the large delay between the instruction to increase and decrease the coal feed and the arrival of the increase and decrease of the air, so it cannot solve the unbalanced combustion situation during dynamic and rapid load changes.

SUMMARY

An aspect relates to a coal-air synchronous dynamic coordinated control method for a coal-fired unit, which is used to solve the problem that the combustion-supporting air volume lags behind the adjustment of the coal feed in the process of rapid peak load regulation of the unit.

To achieve the above purpose, a technical solution provided by the present disclosure is:

A coal-air synchronous dynamic coordinated control method for a coal-fired unit, comprises the following steps in sequence:

S1: in a steady-state operation mode of the unit, acquiring designed coal feed rates and designed flue gas operation wet-basis oxygen contents under different loads, and then determining a corresponding functional relationship between the unit loads L and the designed coal feed rates, and a corresponding functional relationship between the unit loads and the designed flue gas operation wet-basis oxygen contents;

S2: using the regression analysis method, obtaining a regression function of a theoretical wet flue gas volume per unit mass of burning coal and a theoretical combustion-supporting dry air volume per unit mass of burning coal based on a low calorific value by fitting, judging the accuracy of the regression function, and calculating an actual combustion-supporting dry air volume per unit mass of burning coal, and according to the air temperature, relative humidity and atmospheric pressure, calculating the air saturated vapor pressure and a water vapor proportion per unit volume of dry air, and then calculating an actual combustion-supporting wet air volume per unit mass of burning coal and a wet flue gas volume actually produced per unit mass of burning coal;

S3: calculating predicted values of the required combustion-supporting dry air volume and predicted values of the produced wet flue gas volume for the total burning coal per hour under different loads, and by comparing the predicted values and design values of the required combustion-supporting dry air volume, and the predicted values and design values of the produced wet flue gas volume for the total burning coal per hour under different loads, verifying whether relative deviations are within an acceptable range;

S4: acquiring the current load and the actual coal feed rate of the unit, calculating a designed coal feed rate under the current unit load through the corresponding functional relationship between the unit loads and the designed coal feed rates, and calculating an actual low calorific value of feed coal;

S5: according to the actual coal feed rate, the actual operation wet-basis oxygen content and the actual low calorific value of feed coal of the unit, calculating a combustion-supporting dry air volume and a combustion-supporting wet air volume entering the boiler, and the wet flue gas volume at the outlet of a boiler economizer;

S6: according to a load instruction curve of the unit, determining the target value of a load instruction at a future time point, and calculating a unit load change rate within the time, calculating the coal feed rate at the future time point, and calculating a coal feed rate variation within the time, and then calculating a combustion-supporting dry air volume variation and a combustion-supporting wet air volume variation within the time;

S7: calculating an operation wet-basis oxygen content variation caused by the change of the combustion-supporting dry air volume, and according to the corresponding functional relationship between the unit loads and the designed flue gas operation wet-basis oxygen contents, calculating the flue gas operation wet-basis oxygen content at the future time point, and calculating a set wet-basis oxygen content variation within the time, and obtaining an operation wet-basis oxygen content variation within the time;

S8: on the basis of the coal feed rate instruction and the operation wet-basis oxygen content instruction of the original sequence control logic of the unit, respectively superimposing the coal feed rate variation and the operation wet-basis oxygen content variation simultaneously in advance to obtain a target value of the coal feed rate to be adjusted and a target value of the operation wet-basis oxygen content to be adjusted.

Due to the use of the above technical solutions, the present disclosure has the following advantages over the conventional art:

By accurately calculating the combustion-supporting dry air volume and the wet flue gas volume online in real time, and setting the adjustments of the coal feed rate and the operation wet-basis oxygen content synchronously in the same proportion according to the instruction change of the unit load, the present disclosure proposes an air-coal synchronous dynamic coordinated control method that parallel presets coal feed rate and operation wet-basis oxygen content, which maintains the balanced combustion situation of the air-powder in the boiler, effectively improves the following responsiveness of the combustion-supporting dry air, greatly reduces the response lag time of the operation wet-basis oxygen content at the outlet of the boiler economizer, improves the synchronization of the adjustment between the load, burning coal and combustion-supporting dry air, improves the stability of nitrogen oxide concentration at the boiler outlet, effectively reduces fluctuations of steam pressure and temperature caused by excessive regulation, and creates important conditions for the stable operation of the SCR denitration system.

BRIEF DESCRIPTION

Some of the embodiments will be described in detail, with references to the following Figures, wherein like designations denote like members, wherein.

DETAILED DESCRIPTION

The technical solutions of the present disclosure are explained clearly and completely below in conjunction with the accompanying drawings, and apparently, the described embodiments are merely a part of the embodiments of the present disclosure, not all the embodiments. Based on the embodiments of the present disclosure, all other embodiments obtained by one of ordinary skill in the art without creative work fall within the protective scope of the present disclosure.

Figure 2:
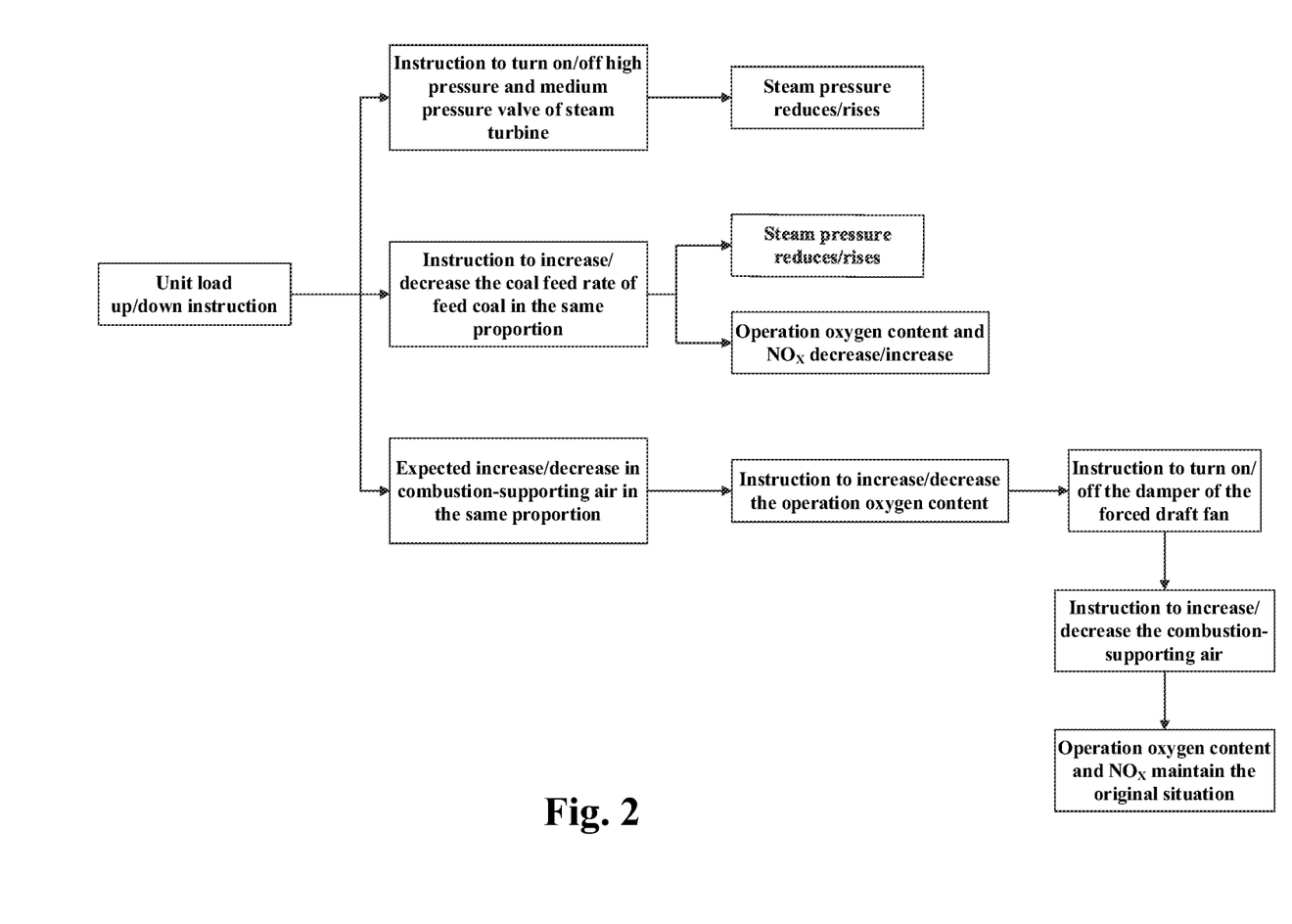
FIG. 2 is a logic block diagram of a coal-air synchronous dynamic coordinated control in an embodiment.

As shown in FIG. 2, a coal-air synchronous dynamic coordinated control method for a coal-fired unit can calculate the combustion-supporting dry air volume and the wet flue gas volume online in real time, obtain the target value of the coal feed rate to be adjusted and the target value of the operation wet-basis oxygen content to be adjusted according to the instruction change of the unit load, and simultaneously set the adjustments of the coal feed rate and the operation wet-basis oxygen content in the same proportion. It comprises the following steps in sequence:

S1: in a steady-state operation mode of the unit, acquiring designed coal feed rates and designed flue gas operation wet-basis oxygen contents under different loads, and then determining: a polyline function of the designed coal feed rates $W_{coal,b}$ with the unit load L as an independent variable, and a polyline function of the designed flue gas operation wet-basis oxygen contents $O_{2,b}$, with the unit load L as an independent variable:

$$W_{coal,b}=f(L,Q_{net,b}),$$

$$O_{2,b}=g(L),$$

where,

L is unit load, in MW, $W_{coal,b}$ is designed coal feed rate, in t/h, $Q_{net,b}$ is designed low calorific value of coal, in MJ/kg, $O_{2,b}$, is designed flue gas operation wet-basis oxygen content, in %.

S2: using the regression analysis method, obtaining a regression function of a theoretical wet flue gas volume $W_{flue,th,wet}$ per unit mass of burning coal and a theoretical combustion-supporting dry air volume $W_{air,th,dry}$ per unit mass of burning coal based on the low calorific value by fitting the elemental analysis data and industrial analysis data of multiple existing sets of coal samples from utility boilers, judging the accuracy of the regression function by variance, if the variance is greater than 0.9, it indicates that the accuracy of the fitting is high, and then calculating an actual combustion-supporting dry air volume $W_{air,act}$ per unit mass of burning coal, and according to air temperature, relative humidity and atmospheric pressure measured in real-time, calculating the air saturated vapor pressure $P_{H_2O}$ and a water vapor volume proportion φ per unit volume of dry air, and then calculating an actual combustion-supporting wet air volume $W_{air,act,wet}$ per unit mass of burning coal and an actually produced wet flue gas volume $W_{flue,act,wet}$ per unit mass of burning coal:

$$W_{flue,th} = \alpha_1 \times Q_{net} + \beta_1,$$

$$W_{air,th} = \alpha_2 \times Q_{net} + \beta_2,$$

$$W_{air,act,dry} = W_{flue,th,wet} \times \frac{O_2}{21 - O_2 \times (1+\varphi)} + W_{air,th,dry} \times \frac{21 - O_2}{21 - O_2 \times (1+\varphi)},$$

$$P_{H_2O} = 611.7927 + 42.7809 \times T_{air} +$$
$$1.6883 \times T_{air}^2 + 0.012079 \times T_{air}^3 + 0.00061637 \times T_{air}^4,$$

$$\varphi = 0.3866 \times (\phi \times P_{air}/100)/(P_{atm} - \phi \times P_{air}/100),$$

$$W_{air,act,wet} = W_{air,act,dry} \times (1+\varphi),$$

$$W_{flue,act,wet} = W_{flue,th,wet} \times \frac{21}{21 - O_2 \times (1+\varphi)} + W_{air,th,dry} \times \frac{21 \times \varphi}{21 - O_2 \times (1+\varphi)},$$

where, $W_{flue,th,wet}$ is theoretical wet flue gas volume per unit mass of burning coal, in m³/kg, $W_{air,th,dry}$ is theoretical combustion-supporting dry air volume per unit mass of burning coal, in m³/kg, $W_{air,act,dry}$ is actual combustion-supporting dry air volume per unit mass of burning coal, in m³/kg, $W_{flue,act,wet}$ is wet flue gas volume produced by the wet basis of per unit mass of burning coal, in m³/kg, $Q_{net}$ is low calorific value of coal, in MJ/kg, $O_2$ is flue gas operation wet-basis oxygen content, in %, $\alpha_1, \alpha_2, \beta_1, \beta_2$ are all constants, and are 0.2467, 0.2496, 0.718, 0.3125, respectively, $P_{H_2O}$, is air saturated vapor pressure, in Pa, $T_{air}$ is air temperature, in °C., Φ is air relative humidity, in %, $P_{atm}$ is atmospheric pressure, in Pa, φ is water vapor volume proportion per unit volume of dry air.

S3: according to the results of industrial analysis (received base ashes, received base water, low calorific values) and elemental analysis (carbon, hydrogen, oxygen, nitrogen, sulfur), obtaining design values of the required combustion-supporting dry air volume $W_{air,b}$ and design values of the produced wet flue gas volume $W_{flue,b}$ for the total burning coal per hour under different loads;

calculating predicted values of the required combustion-supporting dry air volume $W_{air,h}$ and predicted values of the produced wet flue gas volume $W_{flue,h}$ for the total burning coal per hour under the designed wet-basis oxygen contents of different loads:

$$W_{air,h} = W_{air,act,dry} \times W_{coal,b} \times (1-\gamma) \times 1000,$$

$$W_{flue,h} = W_{flue,act,wet} \times W_{coal,b} \times (1-\gamma) \times 1000,$$

where, $W_{air,h}$ is predicted value of the required combustion-supporting dry air volume for the total burning coal per hour, in m³/h, $W_{flue,h}$ is predicted value of the produced wet flue gas volume for the total burning coal per hour, in m³/h, $W_{air,act,dry}$ is actual combustion-supporting dry air volume per unit mass of burning coal, in m³/kg, $W_{flue,act,wet}$ is predicted value of the theoretical wet flue gas volume per unit mass of burning coal, in m³/kg, $W_{coal,b}$ is designed coal feed rate, in t/h, γ is incomplete combustion heat loss ratio of feed coal, and its value is 0.42%.

Calculating the relative deviation $\delta_1$ between the predicted values $W_{air,h}$ and design values $W_{air,b}$ of the required combustion-supporting dry air volume for the total burning coal per hour under different loads, and the relative deviation $\delta_2$ between the predicted values $W_{flue,h}$ and design values $W_{flue,b}$ of the produced wet flue gas volume for the total burning coal per hour under different loads, if the relative deviations $\delta_1$ and $\delta_2$ are both within $-5\% \sim +5\%$, the fitting deviations are within the acceptable range:

$$\delta_1 = \frac{W_{air,h} - W_{air,b}}{W_{air,b}} \times 100\%,$$

$$\delta_2 = \frac{W_{flue,h} - W_{flue,b}}{W_{flue,b}} \times 100\%,$$

where, $W_{air,h}$ is predicted value of the required combustion-supporting dry air volume for the total burning coal per hour, in m³/h, $W_{flue,h}$ is predicted value of the produced wet flue gas volume for the total burning coal per hour, in m³/h, $W_{air,b}$ is design value of the required combustion-supporting dry air volume for the total burning coal per hour, in m³/h, $W_{flue,b}$ is Design Value of the Produced Wet Flue Gas Volume for the Total Burning Coal Per Hour, in m³/h.

S4: acquiring the current load $L_i$ and the actual coal feed rate $W_{coal,act}$ displayed by the DCS system of the unit, calculating a designed coal feed rate $W_{coal,b,\tau}$ under the current unit load $L_\tau$ through the corresponding functional relationship between the unit loads L and the designed coal feed rates $W_{coal,b}$, and calculating an actual low calorific value $Q_{net,act}$ of feed coal;

$$Q_{net,act} = \frac{W_{coal,b,\tau} \times Q_{net,b}}{W_{coal,act}},$$

where, $Q_{net,act}$ is actual low calorific value of feed coal, in MJ/kg, $Q_{net,b}$ is designed low calorific value of feed coal, in MJ/kg, $W_{coal,act}$ is actual coal feed rate under the current unit load $L_\tau$, in t/h, $W_{coal,b,\tau}$ is designed coal feed rate under the current unit load $L_\tau$, in t/h.

S5: according to the actual coal feed rate $W_{coal,act}$, the actual operation wet-basis oxygen content $O_{2,act}$ and the actual low calorific value of feed coal $Q_{net,act}$ displayed by the DCS system of the unit, calculating a combustion-supporting dry air volume BW air,act,dry and a combustion-supporting wet air volume $BW_{air,act,wet}$ entering the boiler, and the wet flue gas volume $BW_{flue,act,wet}$ at the outlet of a boiler economizer under the actual unit load $L_\tau$:

$$BW_{air,act,dry} = \left( W_{flue,th,wet} \times \frac{O_{2,act}}{21 - O_{2,act} \times (1+\varphi)} + W_{air,th,dry} \times \frac{21 - O_{2,act}}{21 - O_{2,act} \times (1+\varphi)} \right) \times W_{coal,act} \times 1000,$$

$$BW_{air,act,wet} = BW_{air,act,dry} \times (1+\varphi),$$

$$BW_{flue,act,wet} = \left( W_{flue,th,wet} \times \frac{21}{21 - O_{2,act} \times (1+\varphi)} + W_{air,th,dry} \times \frac{21 \times \varphi}{21 - O_{2,act} \times (1+\varphi)} \right) \times W_{coal,act} \times 1000,$$

where,
$BW_{air,act,dry}$ is combustion-supporting dry air volume, in m³/h,
$BW_{air,act,wet}$ is combustion-supporting wet air volume, in m³/h,
$BW_{flue,act,wet}$ is outlet wet flue gas volume, in m³/h,
$W_{air,th,dry}$ is theoretical combustion-supporting dry air volume per unit mass of burning coal, in m³/kg,
$W_{flue,th,wet}$ is theoretical wet flue gas volume per unit mass of burning coal, in m³/kg,
$O_{2,act}$ is actual flue gas operation wet-basis oxygen content, in %,
$\varphi$ is water vapor volume proportion per unit volume of dry air,
$W_{coal,act}$ is actual coal feed rate under the current unit load $L_\tau$, in t/h, S6: according to a load instruction curve of the unit set in advance by the power grid dispatch center, determining the target value of a load instruction at a future time point $\Delta\tau$, and calculating a unit load change rate $E_L$ within the time $\Delta\tau$, calculating the coal feed rate $W_{coal,\tau+\Delta\tau}$ at the future time point $\Delta\tau$ and calculating a coal feed rate variation $\Delta W_{coal}$ within the time $\Delta\tau$, and then calculating a combustion-supporting dry air volume variation $\Delta BW_{air,act}$ and a combustion-supporting wet air volume variation $\Delta BW_{air,act,wet}$ within the time $\Delta\tau$:

$$E_L = \frac{L_{\tau+\Delta\tau} - L_\tau}{L_\tau} \times 100,$$

$$W_{coal,\tau+\Delta\tau} = W_{coal,act} \times \left(1 + \frac{E_L}{100}\right),$$

$$\Delta W_{coal} = W_{coal,\tau+\Delta\tau} - W_{coal,act},$$

$$\Delta BW_{air,act,dry} = W_{air,act,dry} \times \Delta W_{coal} \times 1000,$$

$$\Delta BW_{air,act,wet} = \Delta BW_{air,act,dry} \times (1+\varphi),$$

where,
$E_L$ is unit load change rate within the time $\Delta\tau$, in %,
$L_\tau$ is current unit load, in MW,
$L_{\tau+\Delta\tau}$ is unit load after the time $\Delta\tau$, in MW,
$W_{coal,\tau+\Delta\tau}$ is coal feed rate at the future time point $\Delta\tau$, in t/h,
$W_{coal,act}$ is actual coal feed rate under the current unit load $L_\tau$, in t/h,
$\Delta W_{coal}$ is coal feed rate variation within the time $\Delta\tau$, in t/h, $\Delta BW_{air,act,dry}$ is combustion-supporting dry air volume variation within the time $\Delta\tau$, in m³/h,
$\Delta BW_{air,act,wet}$ is combustion-supporting wet air volume variation within the time $\Delta\tau$, in m³/h,
$W_{air,act,dry}$ is actual combustion-supporting dry air volume per unit mass of coal, in m³/kg,
$\varphi$ is water vapor volume proportion per unit volume of dry air.

S7: according to the combustion-supporting dry air volume variation $\Delta BW_{air,act,dry}$ converting an operation wet-basis oxygen content variation $\Delta O_{2,1}$ caused by the change of the combustion-supporting dry air volume, and according to the corresponding functional relationship between the unit loads L and the designed flue gas operation wet-basis oxygen contents $O_{2,b}$, obtaining the flue gas operation wet-basis oxygen content $O_{2,b,\tau}$ at the future time point $\Delta\tau$, and calculating a set wet-basis oxygen content variation $\Delta O_{2,2}$ within the time $\Delta\tau$, and then calculating an operation wet-basis oxygen content variation $\Delta O_2$ within the time $\Delta\tau$;

$$\Delta O_{2,1} = \frac{\Delta BW_{air,act,dry} \times 21}{BW_{flue,act,wet} + \Delta BW_{air,act,wet}},$$

$$\Delta O_{2,2} = O_{2,b,\tau} - O_{2,act},$$

$$\Delta O_2 = \Delta O_{2,1} + \Delta O_{2,2},$$

where,
$\Delta O_{2,1}$ is operation wet-basis oxygen content variation caused by the change of the combustion-supporting dry air volume, in %,
$\Delta BW_{air,act,dry}$ is combustion-supporting dry air volume variation within the time $\Delta\tau$, in m³/h,
$\Delta BW_{air,act,wet}$ is combustion-supporting wet air volume variation within the time $\Delta\tau$, in m³/h,
$BW_{flue,act}$ is outlet wet flue gas volume, in m³/h,
$\Delta O_{2,2}$ is set wet-basis oxygen content variation within the time $\Delta\tau$, in %,
$O_{2,b,\tau}$ is flue gas operation wet-basis oxygen content at the future time point $\Delta\tau$, in %,
$O_{2,act}$ is actual operation wet-basis oxygen content, in %,
$\Delta O_2$ is operation wet-basis oxygen content variation within the time $\Delta\tau$, in %.

S8: on the basis of the coal feed rate instruction and the operation wet-basis oxygen content instruction of the original DCS sequence control logic of the unit, respectively superimposing the coal feed rate variation $\Delta W_{coal}$ and the operation wet-basis oxygen content variation $\Delta O_2$ simultaneously in advance to obtain a target value $W_{coal,new}$ of the coal feed rate to be adjusted and a target value $O_{2,new}$ of the operation wet-basis oxygen content to be adjusted:

$$W_{coal,new} = W_{coal,act} + \Delta W_{coal},$$

$$O_{2,new} = O_{2,act} + \Delta O_2,$$

where,
$W_{coal,new}$ is target value of the coal feed rate to be adjusted, in t/h,
$W_{coal,act}$ is actual coal feed rate under the current unit load $L_\tau$, in t/h,
$\Delta W_{coal}$ is coal feed rate variation within the time $\Delta\tau$, in t/h,
$O_{2,new}$ is target value of the operation wet-basis oxygen content to be adjusted, in %,
$O_{2,act}$ is actual operation wet-basis oxygen content, in %,
$\Delta O_2$ is operation wet-basis oxygen content variation within the time $\Delta\tau$, in %.

Specific embodiments are given below for detailed explanation:

A unit of 350 MW was selected, and the calculation of the target value of the coal feed rate to be adjusted and the target value of the wet-basis oxygen content to be adjusted within 30 seconds when the current unit load was 300 MW, comprised the following steps:

S1: In a steady-state operation mode of the unit, the designed coal feed rates and flue gas operation wet-basis oxygen contents under the loads of 367.5 MW, 350 MW, 367.5 MW, 175 MW, and 87.5 MW were acquired, and the designed low calorific value of coal $Q_{net,b}$ was 21.652 MJ/kg, as shown in Table 1. Then the specific functional relationship between the unit loads L and the designed coal feed rates $W_{coal,b}$ was:

$$W_{coal,b} = k \times L + b,$$

where,

L is unit load, in MW;

$W_{coal,b}$ is designed coal feed rate, in t/h;

k and b are both constants, and are 0.3545 and 9.7697, respectively,

TABLE 1

Coal feed rates and flue gas operation wet-basis oxygen contents under different loads

| Items | Units | Numeral values | | | | |
|---|---|---|---|---|---|---|
| Load rate | % | 105 | 100 | 75 | 50 | 25 |
| Unit load L | MW | 367.5 | 350 | 267.5 | 175 | 87.5 |
| Designed flue gas operation wet-basis oxygen content $O_{2,b}$ | % | 3.6 | 3.6 | 3.6 | 4.5 | 6.8 |
| Designed coal feed rate $W_{coal,b}$ | t/h | 139.23 | 135.38 | 103.39 | 72.36 | 40.75 |

S2: It was known that the wet-basis oxygen content $O_{2,b}$ was 3.6%, the designed low calorific value of coal feed $Q_{net,b}$ was 21.652 MJ/kg, then it can be calculated that $W_{flue,th,wet}=6.059548$ m³/kg and $W_{air,th,dry}=5.716839$ m³/kg, and by fitting the elemental analysis data and industrial analysis data of more than 500 sets of coal samples from utility boilers, the variances of the theoretical wet flue gas volume $W_{flue,th,wet}$ per unit mass of burning coal and theoretical combustion-supporting dry air volume $W_{air,th,dry}$ per unit mass of burning coal were respectively 0.9763 and 0.9858, both of which were greater than 0.9, therefore the accuracy of the fitting was high, and the actual combustion-supporting dry air volume per unit mass of burning coal were calculated to be $W_{air,act,wet}=6.97741$ m³/kg. The designed air temperature was 20° C., the relative humidity was 55%, the atmospheric pressure was 101000 Pa, and the water vapor proportion in unit volume of dry air was calculated to be $\varphi=0.00499$.

S3: When the unit load was 367.5 MW, according to the results of industrial analysis and elemental analysis, the design value $W_{air,b}$ of the required combustion-supporting dry air volume for the total burning coal per hour under the unit load of 367.5 MW was 952746 m³/h, and the design value $W_{flue,b}$ of the produced wet flue gas volume was 1030231 m³/h; it was known that the designed coal feed rate $W_{coal,b}$ was 139.23 t/h, then the predicted value of the required combustion-supporting dry air volume for the total burning coal per hour was $W_{air,h}=6.97741\times139.23\times(1-0.42\%)\times1000=967385$ m³/h, and the predicted value of the produced wet flue gas volume for the total burning coal per hour was $W_{flue,h}=7.3552\times139.23\times(1-0.42\%)\times1000=1019768$ m³/h; the relative deviation of the combustion-supporting dry air volume was $$\delta_1 = \frac{(967385 - 952746)}{952746} \times 100\% = 1.54\%,$$

and the relative deviation of the produced wet flue gas volume was $$\delta_2 = \frac{(1019768 - 1030231)}{91030231} \times 100\% = -1.02\%.$$

The calculation process under other loads was the same as that under the load of 367.5 MW, and will not be repeated here. The specific calculation results are shown in Table 2.

According to the calculation results in Table 2, it can be seen that the relative deviations between the predicted values $W_{air,h}$ and design values $W_{air,b}$ of the required combustion-supporting dry air volume for the total burning coal per hour under different loads were 1.54%~2.61%, the relative deviations between the predicted values $W_{flue,h}$ and design values $W_{flue,b}$ of the produced wet flue gas volume were −0.1.02%~+0.63%, and the relative deviations were all between −5% and 5%, so it can be judged that the fitting deviation was within the acceptable range.

TABLE 2

Predicted values and design values of the required combustion-supporting dry air volume and the produced wet flue gas volume for the total burning coal per hour

| Items | Units | Numeral values | | | | |
|---|---|---|---|---|---|---|
| Unit load L | MW | 367.5 | 350 | 267.5 | 175 | 87.5 |
| Design value of the required combustion-supporting dry air volume for the total burning coal per hour $W_{air,b}$ | m³/h | 952746 | 926373 | 707502 | 524053 | 341609 |
| Predicted value of the required combustion-supporting dry air volume for the total burning coal per hour $W_{air,h}$ | m³/h | 967385 | 940635 | 718365 | 531706 | 350539 |
| Relative deviation $\delta_1$ | % | 1.54 | 1.54 | 1.54 | 1.46 | 2.61 |
| Design value of the produced flue gas volume for the total burning coal per hour $W_{flue,b}$ | m³/h | 1030231 | 1001769 | 765077 | 564154 | 363923 |

TABLE 2-continued

Predicted values and design values of the required combustion-supporting dry air volume and the produced wet flue gas volume for the total burning coal per hour

| Items | Units | Numeral values | | | | |
|---|---|---|---|---|---|---|
| Predicted value of the produced flue gas volume for the total burning coal per hour $W_{flue, h}$ | m³/h | 1019768 | 991569 | 757264 | 559082 | 366224 |
| Relative deviation $\delta_2$ | % | −1.02 | −1.02 | −1.02 | −0.90 | 0.63 |

S4: When the current unit load $L_\tau$ was 300 MW, the actual coal feed rate $W_{coal,act}$ displayed by the DCS system of the unit was 121.5 t/h, and through the corresponding functional relationship between the unit loads L and the designed coal feed rates $W_{coal,b}$, the designed coal feed rate under the current unit load of 300 MW was calculated to be $W_{coal,b,\tau}$=0.3545×300+9.769=116.12 t/h, then the actual low calorific value of feed coal was calculated to be $$Q_{net,act} = \frac{116.12 \times 21.652}{121.5} = 20.693 \text{ MJ/Kg}.$$

S5: When the current unit load $L_\tau$ was 300 MW, the actual operation wet-basis oxygen content $O_{2,act}$ was 3.2%, then the combustion-supporting dry air volume entering the boiler can be calculated to be:

$$BW_{air,act,dry} = \\ \left((0.2496 \times 20.693 + 0.3125) \times \frac{21-3.2}{21-3.2 \times (1+0.00499)} + (0.2467 \times 20.693 + \\ 0.718) \times \frac{3.2}{21-3.2 \times (1+0.00499)}\right) \times 121.5 \times 1000 = 793414 \text{ m}^3/\text{h},$$

the wet flue gas volume at the outlet of the boiler economizer was calculated to be:

$$BW_{flue,act,wet} = \\ \left((0.2467 \times 20.693 + 0.718) \times \frac{21}{21-3.2 \times (1+0.00499)} + (0.2496 \times 20.693 + \\ 0.3125) \times \frac{21 \times 0.00499}{21-3.2 \times (1+0.00499)}\right) \times 121.5 \times 1000 = 839350 \text{ m}^3/\text{h}.$$

S6: The current time was 13:15:00, the current unit load displayed by the DCS system of the unit $L_\tau$ was 300 MW, and according to the load instruction curve of the unit set in advance by the power grid dispatch center, the unit load $L_{\tau+\Delta\tau}$ after 30 seconds was 303.85 MW or 295.765 MW, therefore, the unit load change rate within 30 seconds was calculated to be $$E_L = \frac{303.85 - 300}{300} \times 100 = 1.283\% \text{ or}$$

$$E_L = \frac{295.765 - 300}{300} \times 100 = -1.412\%,$$

the coal feed rate after 30 seconds was calculated to be $$W_{coal,\tau+\Delta\tau} = 121.5 \times \left(1 + \frac{1.283}{100}\right) = 123.059 \text{ t/h or}$$

$$W_{coal,\tau+\Delta\tau} = 121.5 \times \left(1 + \frac{-1.412}{100}\right) = 119.784 \text{ t/h},$$

and the coal feed rate variation within 30 seconds was calculated to be $\Delta W_{coal}$=123.059−121.5=1.559 t/h or $\Delta W_{coal}$=119.784−121.5=−1.716 t/h, then the combustion-supporting dry air volume variation within 30 seconds was calculated to be $$\Delta BW_{air,act,dry} = \left((0.2496 \times 20.693 + 0.3125) \times \frac{21-3.2}{21-3.2 \times (1+0.00499)} + \\ (0.2467 \times 20.693 + 0.718) \times \frac{3.2}{21-3.2 \times (1+0.00499)}\right) \times \\ 1.559 \times 1000 = 10180 \text{ m}^3/\text{h or } \Delta BW_{air,act,dry} = \\ \left((0.2496 \times 20.693 + 0.3125) \times \frac{21-3.2}{21-3.2 \times (1+0.00499)} + \\ (0.2467 \times 20.693 + 0.718) \times \frac{3.2}{21-3.2 \times (1+0.00499)}\right) \times \\ (-1.716) \times 1000 = -11205 \text{ m}^3/\text{h}.$$

S7: According to the combustion-supporting dry air volume variation $\Delta BW_{air,act,dry}$, air,act,dry, the operation wet-basis oxygen content variation caused by the change of the combustion-supporting dry air volume was converted to be $$\Delta O_{2,1} = \frac{10180 \times 21}{839350 + 10180 \times (1+0.00499)} = 0.252\% \text{ or}$$

$$\Delta O_{2,1} = \frac{-11205 \times 21}{834350 - 11205 \times (1+0.00499)} = -0.286\%,$$

according to the corresponding functional relationship between the unit loads L and the designed flue gas operation wet-basis oxygen contents $O_{2,b}$, the design value $O_{2,b,\tau}$ of the flue gas operation wet-basis oxygen content after 30 seconds was 3.6%, and the set wet-basis oxygen content variation within 30 seconds was calculated to be $\Delta O_{2,2}$=3.6−3.2=0.40%, then the operation wet-basis oxygen content variation within 30 seconds was calculated to be $\Delta O_2$=0.252+ 0.40=0.652% or $\Delta O_2$=−0.286+0.40=0.114%.

S8: On the basis of the coal feed rate instruction and the operation wet-basis oxygen content instruction of the original sequence control logic of the unit, the coal feed rate variation and the operation wet-basis oxygen content variation were respectively superimposed simultaneously in advance to obtain the target value of the coal feed rate to be adjusted:

$$W_{coal,new}=121.5+1.559=123.059 \text{ t/h or}$$
$$W_{coal,new}=121.5-1.716=119.784 \text{ t/h}$$

and the target value of the operation wet-basis oxygen content to be adjusted:

$$O_{2,new}=3.2+0.652=3.852\% \text{ or } O_{2,new}=3.2+0.114=3.314\%.$$

According to the obtained the target value $W_{coal,new}=119.784$ t/h of the coal feed rate to be adjusted and the target value $O_{2,new}=3.314\%$ of the operation wet-basis oxygen content to be adjusted, the adjustments of the coal feed rate and the operation wet-basis oxygen content were simultaneously set in the same proportion.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A coal-air synchronous dynamic coordinated control method for a coal-fired unit, comprising the following:
    S1: in a steady-state operation mode of the coal-fired unit, acquiring configured coal feed rates and configured flue gas operation wet-basis oxygen contents under different loads, and then determining a corresponding functional relationship between unit loads L and the configured coal feed rates $W_{coal,b}$, and a corresponding functional relationship between the unit loads L and the configured flue gas operation wet-basis oxygen contents $O_{2,b}$;
    S2: using a regression analysis method, obtaining a regression function of a theoretical wet flue gas volume $W_{flue,th,wet}$ per unit mass of burning coal and a theoretical combustion-supporting dry air volume $W_{air,th,dry}$ per unit mass of burning coal based on a low calorific value by fitting, judging accuracy of the regression function, and calculating an actual combustion-supporting dry air volume $W_{air,act,dry}$ per unit mass of burning coal, and according to air temperature, relative humidity and atmospheric pressure, calculating air saturated vapor pressure $P_{H_2O}$ and a water vapor proportion $\varphi$ per unit volume of dry air, and then calculating an actual combustion-supporting wet air volume $W_{air,act,wet}$ per unit mass of burning coal and a wet flue gas volume $W_{flue,act,wet}$ actually produced per unit mass of burning coal;
    S3: calculating predicted values $W_{air,h}$ of a required combustion-supporting dry air volume and predicted values $W_{flue,h}$ of a produced wet flue gas volume for the total burning coal per hour under different loads, and by comparing the predicted values $W_{air,h}$ and design values $W_{air,b}$ of the required combustion-supporting dry air volume, and the predicted values $W_{flue,h}$ and design values $W_{flue,b}$ of the produced wet flue gas volume for the total burning coal per hour under different loads, verifying whether relative deviations $\delta$ are within an acceptable range;
    S4: acquiring current load $L_\tau$ and actual coal feed rate $W_{coal,act}$ of the coal-fired unit, calculating a configured coal feed rate $W_{coal,b,\tau}$ under the current unit load $L_\tau$ through the corresponding functional relationship between the unit loads L and the configured coal feed rates $W_{coal,b}$, and calculating an actual low calorific value $Q_{net,act}$ of feed coal;
    S5: according to the actual coal feed rate $W_{coal,act}$, actual operation wet-basis oxygen content $O_{2,act}$ and the actual low calorific value $Q_{net,act}$ of feed coal, calculating a combustion-supporting dry air volume $BW_{air,act,dry}$ and a combustion-supporting wet air volume $BW_{air,act,wet}$ entering a boiler in real time, and the wet flue gas volume $BW_{flue,act,wet}$ at an outlet of a boiler economizer;
    S6: according to a load instruction curve of the coal-fired unit, determining a target value of a load instruction at a future time point $\Delta\tau$, and calculating a unit load change rate $E_L$ within the time $\Delta\tau$, calculating a coal feed rate $W_{coal,\tau+\Delta\tau}$ at the future time point $\Delta\tau$, and calculating a coal feed rate variation $\Delta W_{coal}$ within the time $\Delta\tau$, and then calculating a combustion-supporting dry air volume variation $\Delta BW_{air,act,dry}$ and a combustion-supporting wet air volume variation $\Delta BW_{air,act,wet}$ within the time $\Delta\tau$;
    S7: calculating an operation wet-basis oxygen content variation $\Delta O_{2,1}$ caused by a change of the combustion-supporting dry air volume, and according to the corresponding functional relationship between the unit loads L and the configured flue gas operation wet-basis oxygen contents $O_{2,b}$, obtaining a flue gas operation wet-basis oxygen content $O_{2,b,\tau}$ at the future time point $\Delta\tau$, and calculating a set wet-basis oxygen content variation $\Delta O_{2,2}$ within the time $\Delta\tau$, and then obtaining an operation wet-basis oxygen content variation $\Delta O_2$ within the time $\Delta\tau$;
    S8: on the basis of a coal feed rate instruction and an operation wet-basis oxygen content instruction of an original DCS sequence control logic of the unit, respectively superimposing the coal feed rate variation $\Delta W_{coal}$ and the operation wet-basis oxygen content variation $\Delta O_2$ simultaneously in advance to obtain a target value $W_{coal,new}$ of the coal feed rate to be adjusted and a target value $O_{2,new}$ of the operation wet-basis oxygen content to be adjusted; and
    adjusting the coal feed rate and the operation wet-basis oxygen content of the coal-fired unit based on the target value $W_{coal,new}$ of the coal feed rate and the target value $O_{2,new}$ of the operation wet-basis oxygen content, obtained in S8.

2. The coal-air synchronous dynamic coordinated control method for the coal-fired unit according to claim 1, wherein the corresponding functional relationship between the unit loads L and the configured coal feed rates $W_{coal,b}$, and the corresponding functional relationship between the unit loads L and the configured flue gas operation wet-basis oxygen contents $O_{2,b}$ are respectively:

$$W_{coal,b}=f(L,Q_{net,b}),$$

$$O_{2,b}=g(L),$$

where,
L is unit load, in MW,
$W_{coal,b}$ is configured coal feed rate, in t/h,
$Q_{net,b}$ is configured low calorific value of coal, in MJ/kg,
$O_{2,b}$ is configured flue gas operation wet-basis oxygen content, in %.

3. The coal-air synchronous dynamic coordinated control method for the coal-fired unit according to claim 1, wherein the theoretical wet flue gas volume $W_{flue,th,wet}$ per unit mass of burning coal and the theoretical combustion-supporting dry air volume $W_{air,th,dry}$ per unit mass of burning coal are obtained by fitting elemental analysis data and industrial analysis data of multiple existing sets of coal samples from utility boilers.

4. The coal-air synchronous dynamic coordinated control method for the coal-fired unit according to claim 3, wherein the industrial analysis data comprises received base ashes, received base water and low calorific values, and the elemental analysis data comprises contents of carbon, hydrogen, oxygen, nitrogen, and sulfur.

5. The coal-air synchronous dynamic coordinated control method for the coal-fired unit according to claim 1, wherein the theoretical wet flue gas volume per unit mass of burning coal $W_{flue,th,wet}$, the theoretical combustion-supporting dry air volume per unit mass of burning coal $W_{air,th,dry}$, the air saturated vapor pressure $P_{H_2O}$, water vapor proportion per unit volume of dry air $\varphi$, the actual combustion-supporting wet air volume $W_{air,act,wet}$ per unit mass of burning coal, the wet flue gas volume $W_{flue,act,wet}$ actually produced per unit mass of burning coal, and the actual combustion-supporting dry air volume $W_{air,act,dry}$ per unit mass of burning coal are respectively:

$$W_{flue,th,wet} = a_1 \times Q_{net} + \beta_1,$$

$$W_{air,th,dry} = a_2 \times Q_{net} + \beta_2,$$

$$P_{H_2O} = 611.7927 + 42.7809 \times T_{air} +$$
$$1.6883 \times T_{air}^2 + 0.012079 \times T_{air}^3 + 0.00061637 \times T_{air}^4,$$

$$\varphi = 0.3866 \times (\phi \times P_{air}/100)/(P_{atm} - \phi \times P_{air}/100),$$

$$W_{air,act,dry} = W_{flue,th,wet} \times \frac{O_2}{21 - O_2 \times (1+\varphi)} + W_{air,th,dry} \times \frac{21 - O_2}{21 - O_2 \times (1+\varphi)},$$

$$W_{air,act,wet} = W_{air,act,dry} \times (1+\varphi),$$

$$W_{flue,act,wet} = W_{flue,th,wet} \times \frac{21}{21 - O_2 \times (1+\varphi)} + W_{air,th,dry} \times \frac{21}{21 - O_2 \times (1+\varphi)},$$

where,
$W_{flue,th,wet}$ is theoretical wet flue gas volume per unit mass of burning coal, in m³/kg,
$w_{air,th,dry}$ is theoretical combustion-supporting dry air volume per unit mass of burning coal, in m³/kg,
$Q_{net}$ is low calorific value of coal, in MJ/kg,
$\alpha_1, \alpha_2, \beta_1, \beta_2$ are all constants,
$P_{H_2O}$ is air saturated vapor pressure, in Pa,
$T_{air}$ is air temperature, in °C.,
$\phi$ is air relative humidity, in %,
$P_{atm}$ is atmospheric pressure, in Pa,
$W_{air,act,dry}$ is actual combustion-supporting dry air volume per unit mass of burning coal, in m³/kg,
$W_{air,th,dry}$ is theoretical combustion-supporting dry air volume per unit mass of burning coal, in m³/kg,
$W_{flue,th,wet}$ is theoretical wet flue gas volume per unit mass of burning coal, in m³/kg,
$W_{flue,act,wet}$ is actually produced wet flue gas volume per unit mass of burning coal, in m³/kg,
$O_2$ is flue gas operation wet-basis oxygen content, in %,
$\varphi$ is water vapor volume proportion per unit volume of dry air.

6. The coal-air synchronous dynamic coordinated control method for the coal-fired unit according to claim 1, wherein the accuracy of the regression function is judged by the variances, and the variances are greater than 0.9.

7. The coal-air synchronous dynamic coordinated control method for the coal-fired unit according to claim 1, wherein the predicted value $W_{air,h}$ of the required combustion-supporting dry air volume and the predicted value $W_{flue,h}$ of the produced flue gas volume under a configured operation wet-basis oxygen content for the total burning coal per hour are respectively:

$$W_{air,h} = W_{air,act,dry} \times W_{coal,b} \times (1-\gamma) \times 1000,$$

$$W_{flue,h} = W_{flue,act,wet} \times W_{coal,b} \times (1-\gamma) \times 1000,$$

where,
$W_{air,h}$ is predicted value of the required combustion-supporting dry air volume for the total burning coal per hour, in m³/h,
$W_{flue,h}$ is predicted value of the produced wet flue gas volume for the total burning coal per hour, in m³/h,
$W_{air,act,dry}$ is actual combustion-supporting dry air volume per unit mass of burning coal, in m³/kg,
$W_{flue,th,wet}$ is theoretical wet flue gas volume per unit mass of burning coal, in m³/kg,
$W_{coal,b}$ is configured coal feed rate, in t/h,
$\gamma$ is incomplete combustion heat loss ratio of feed coal.

8. The coal-air synchronous dynamic coordinated control method for the coal-fired unit according to claim 1, wherein the acceptable range of the relative deviations $\delta$ is $-5\% \sim +5\%$, and the relative deviations $\delta$ comprises a relative deviation $\delta_1$ between the predicted values $W_{air,h}$ and design values $W_{air,b}$ of the required combustion-supporting dry air volume for the total burning coal per hour, and a relative deviation $\delta_2$ between the predicted values $W_{flue,h}$ and design values $W_{flue,b}$ of the produced wet flue gas volume for the total burning coal per hour, and the relative deviation $\delta_1$ and the relative deviation $\delta_2$ are respectively:

$$\delta_1 = \frac{W_{air,h} - W_{air,b}}{W_{air,b}} \times 100\%,$$

$$\delta_2 = \frac{W_{flue,h} - W_{flue,b}}{W_{flue,b}} \times 100\%,$$

where,
$W_{air,h}$ is predicted value of the required combustion-supporting dry air volume for the total burning coal per hour, in m³/h,
$W_{flue,h}$ is predicted value of the produced wet flue gas volume for the total burning coal per hour, in m³/h,
$W_{air,b}$ is design value of the required combustion-supporting dry air volume for the total burning coal per hour, in m³/h,
$W_{flue,b}$ is design value of the produced wet flue gas volume for the total burning coal per hour, in m³/h.

9. The coal-air synchronous dynamic coordinated control method for the coal-fired unit according to claim 1, wherein the actual low calorific value $Q_{net,act}$ of feed coal is:

$$Q_{net,act} = \frac{W_{coal,b,r} \times Q_{net,b}}{W_{coal,act}},$$

where,
$Q_{net,act}$ is actual low calorific value of feed coal, in MJ/kg,
$Q_{net,b}$ is configured low calorific value of feed coal, in MJ/kg, $W_{coal,act}$ is actual coal feed rate under the current unit load $L_\tau$, in t/h, $W_{coal,b,i}$ is configured coal feed rate under the current unit load $L_\tau$, in t/h.

10. The coal-air synchronous dynamic coordinated control method for the coal-fired unit according to claim 1, wherein the current unit load $L_\tau$, the actual coal feed rate $W_{coal,act}$, the actual operation wet-basis oxygen content $O_{2,act}$, and the actual low calorific value $Q_{net,act}$ of feed coal are all obtained through a DCS system of the unit.

11. The coal-air synchronous dynamic coordinated control method for the coal-fired unit according to claim 1, under the actual coal feed rate, the combustion-supporting dry air volume $BW_{air,act,dry}$, the combustion-supporting wet air volume $BW_{air,act,wet}$, and the wet flue gas volume $BW_{flue,act,wet}$ at outlet are respectively:

$$BW_{air,act,dry} = \left(W_{flue,th,wet} \times \frac{O_{2,act}}{21 - O_{2,act} \times (1 + \varphi)} + W_{air,th,dry} \times \frac{21 - O_{2,act}}{21 - O_{2,act} \times (1 + \varphi)}\right) \times W_{coal,act} \times 1000,$$

$$BW_{air,act,wet} = BW_{air,act,dry} \times (1 + \varphi),$$

$$BW_{flue,act,wet} = \left(W_{flue,th,wet} \times \frac{21}{21 - O_{2,act} \times (1 + \varphi)} + W_{air,th,dry} \times \frac{21 \times \varphi}{21 - O_{2,act} \times (1 + \varphi)}\right) \times W_{coal,act} \times 1000,$$

where, $BW_{air,act,dry}$ is combustion-supporting dry air volume, in $m^3/h$, $BW_{air,act,wet}$ is combustion-supporting wet air volume, in $m^3/h$, $O_{2,act}$ is actual operation wet-basis oxygen content, in %, $W_{air,th,dry}$ is theoretical combustion-supporting dry air volume per unit mass of burning coal, in $m^3/kg$, $W_{flue,th,wet}$ is theoretical wet flue gas volume per unit mass of burning coal, in $m^3/kg$, $BW_{flue,act,wet}$ is wet flue gas volume at outlet, in $m^3/h$, $W_{coal,act}$ is actual coal feed rate under the current unit load $L_\tau$, in t/h, $\varphi$ is water vapor volume proportion per unit volume of dry air.

12. The coal-air synchronous dynamic coordinated control method for the coal-fired unit according to claim 1, wherein the load instruction curve is set in advance by a power grid dispatch center.

13. The coal-air synchronous dynamic coordinated control method for the coal-fired unit according to claim 1, wherein the unit load change rate $E_L$ within the time $\Delta\tau$, the coal feed rate $W_{coal,\tau+\Delta\tau}$ at the future time point $\Delta\tau$, the coal feed rate variation $\Delta W_{coal}$ within the time $\Delta\tau$, and the combustion-supporting dry air volume variation $\Delta BW_{air,act,dry}$ and the combustion-supporting wet air volume variation $\Delta BW_{air,act,wet}$ within the time $\Delta\tau$ are respectively:

$$E_L = \frac{L_{\tau+\Delta\tau} - L_\tau}{L_\tau} \times 100,$$

$$W_{coal,\tau+\Delta\tau} = W_{coal,act} \times \left(1 + \frac{E_L}{100}\right),$$

-continued $$\Delta W_{coal} = W_{coal,\tau+\Delta\tau} - W_{coal,act},$$

$$\Delta BW_{air,act,dry} = W_{air,act,dry} \times \Delta W_{coal} \times 1000,$$

$$\Delta BW_{air,act,wet} = \Delta BW_{air,act,dry} \times (1 + \varphi),$$

where, $E_L$ is unit load change rate within the time $\Delta\tau$, in %, $L_\tau$ is current unit load, in MW, $L_{\tau+\Delta\tau}$ is unit load after the time $\Delta\tau$, in MW, $W_{coal,\tau+\Delta\tau}$ is coal feed rate at the future time point $\Delta\tau$, in t/h, $W_{coal,act}$ is current actual coal feed rate under the current unit load $L_\tau$, in t/h, $\Delta W_{coal}$ is coal feed rate variation within the time $\Delta\tau$, in t/h, $\Delta BW_{air,act,dry}$ is combustion-supporting dry air volume variation within the time $\Delta\tau$, in $m^3/h$, $\Delta BW_{air,act,wet}$ is combustion-supporting wet air volume variation within the time $\Delta\tau$, in $m^3/h$, $W_{air,act,dry}$ is actual combustion-supporting dry air volume per unit mass of coal, in $m^3/kg$, $\varphi$ is water vapor volume proportion per unit volume of dry air.

14. The coal-air synchronous dynamic coordinated control method for the coal-fired unit according to claim 1, wherein the operation wet-basis oxygen content variation $\Delta O_{2,1}$ caused by the change of the combustion-supporting dry air volume, the set wet-basis oxygen content variation $\Delta O_{2,2}$ within the time $\Delta\tau$, and the operation wet-basis oxygen content variation $\Delta O_2$ within the time $\Delta\tau$ are respectively:

$$\Delta O_{2,1} = \frac{\Delta BW_{air,act,dry} \times 21}{BW_{flue,act,wet} + \Delta BW_{air,act,wet}}$$

$$\Delta O_{2,2} = O_{2b\tau} - O_{2,act},$$

$$\Delta O_2 = \Delta O_{2,1} + \Delta O_{2,2},$$

where, $\Delta O_{2,1}$ is operation wet-basis oxygen content variation caused by the change of the combustion-supporting dry air volume, in %, $\Delta BW_{air,act,dry}$ is combustion-supporting dry air volume variation within the time $\Delta\tau$, in $m^3/h$, $\Delta BW_{air,act,wet}$ is combustion-supporting wet air volume variation within the time $\Delta\tau$, in $m^3/h$, $BW_{flue,act,wet}$ is wet flue gas volume at outlet, in $m^3/h$, $\Delta O_{2,2}$ is set wet-basis oxygen content variation within the time $\Delta\tau$, in %, $O_{2,b,\tau}$ is flue gas operation wet-basis oxygen content at the future time point $\Delta\tau$, in %, $O_{2,act}$ is actual operation wet-basis oxygen content, in %, $\Delta O_2$ is operation wet-basis oxygen content variation within the time $\Delta\tau$, in %.

15. The coal-air synchronous dynamic coordinated control method for the coal-fired unit according to claim 1, wherein the target value $W_{coal,new}$ of the coal feed rate to be adjusted and the target value $O_{2,new}$ of the operation wet-basis oxygen content to be adjusted are respectively:

$$W_{coal,new} = W_{coal,act} + \Delta W_{coal},$$

$$O_{2,new} = O_{2,act} + \Delta O_2,$$

where, $W_{coal,new}$ is target value of the coal feed rate to be adjusted, in t/h, $W_{coal,act}$ is actual coal feed rate under the current unit load $L_\tau$, in t/h, $\Delta W_{coal}$ is coal feed rate variation within the time $\Delta\tau$, in t/h, $O_{2,new}$ is target value of the operation wet-basis oxygen content to be adjusted, in %, $O_{2,act}$ is actual operation wet-basis oxygen content, in %, $\Delta O_2$ is operation wet-basis oxygen content variation within the time $\Delta\tau$, in %.

* * * * *